3,085,088
16β-ALKOXYSTEROIDS AND PROCESSES FOR PRODUCING THE SAME
Hans Reimann, Bloomfield, and Elliot L. Shapiro, Irvington, N.J., assignors to Schering Corporation, Bloomfield, N.J., a corporation of New Jersey
No Drawing. Filed Mar. 12, 1959, Ser. No. 798,836
20 Claims. (Cl. 260—239.55)

This invention relates to a new series of physiologically active steroid derivatives and is more particularly concerned with the provision of certain unique 16β-alkoxy-substituted steroids which possess chemotherapeutic utility in the treatment of rheumatoid arthritis and similar inflammatory disorders, as well as related steroidal compounds of the same general class which form valuable intermediates for use in the production of the anti-inflammatory agents of the invention among other possible synthetic steroids. The invention further contemplates the provision of certain new and improved processing techniques applicable to the production of the 16β-alkoxy steroids of the invention.

It is now well established that the efficacy of the early steroidal therapeutic agents such as cortisone and hydrocortisone can be enhanced substantially through modification of the structures of these hormones in such a manner as to reduce or delay inactivation of the molecules, believed to be promoted by natural mechanisms in the human body. To this end, past efforts have resulted in the provision of the $\Delta^{1,4}$ and $\Delta^{1,4,6}$ derivatives, C-9 halogenated and C-6,9 dihalogenated derivatives, C-2 and C-6 methylated analogs, C-14 and C-16 hydroxylated derivatives, C-16 methylated derivatives, and combinations of these analogous structures, among other compounds of somewhat lesser importance. Significantly, while certain of the above-enumerated compounds have demonstrated enhanced anti-inflammatory activity, at least some have also evidenced untoward side effects such as increased salt retention and edema-producing characteristics, disturbances in estrogenic and androgenic activity, loss of bone calcium, ulcerogenesis, potassium loss, etc. Of particular interest from the standpoint of present research efforts are the salt and water retention characteristics induced through use of several of the otherwise most efficacious anti-inflammatory agents available today including, for example, the 9α-halo corticoids.

The present invention is based, in part, on our discovery that the 16β-alkxy substituents serve to reduce or eliminate the undesirable side effects of salt and water retention common to several of the more potent anti-inflammatory steroids, thereby converting these derivatives into useful and valuable chemotherapeutic agents for the treatment of arthritis and other inflammatory disorders. It is additionally postulated that the presence of the 16β-alkoxy groups serves to a limited extent to stabilize or screen the active centers of the steroid molecules against metabolic breakdown, thereby further enhancing the normal anti-inflammatory activity of our products through protracted or sustained existence of the same within the body. In the same manner, the reduction in chemical reactivity to be expected at C-20, for example, by reason of the 16β-alkoxy substituents, renders the compounds of the invention independently useful as intermediates in the production of other steroidal derivatives.

The unique compounds of our invention may be represented in general by the following formulae:

(A)
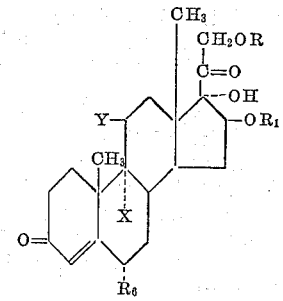

(B)
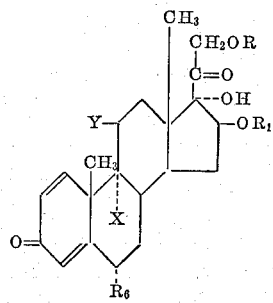

and (C)
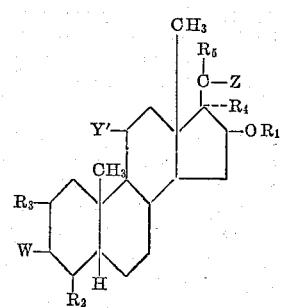

wherein W is a member selected from the group consisting of oxygen, and hydroxy, ethylenedioxy and acetoxy radicals; X is a member selected from the group consisting of hydrogen, bromine, chlorine and fluorine atoms; Y is a member selected from the group consisting of oxygen, hydroxy, hydrogen—in which case the C–9:C–11 bond is olefinic and replaces X, and an epoxy radical having one valence linked to C–9 and also replacing X; Y′ is a member seelcted from the group consisting of oxygen and hydroxy; Z is a member selected from the group consisting of oxygen and hydrogen—in which case the C–17:C–20 bond is olefinic and replaces $R_4$; R is a member selected from the group consisting of hydrogen and lower acyl radicals; $R_1$ is a lower alkyl radical; $R_2$ and $R_3$ are each members selected from the group consisting of hydrogen and bromine; $R_4$ is a member selected from the group consisting of hydrogen, halogen and hydroxy; $R_5$ is a member selected from the group consisting of methyl, halomethylene, hydroxymethylene, methoxycarbonyl and acyloxymethylene (—$CH_2O$—Ac) radicals; and $R_6$ is a member selected from the group consisting of hydrogen, halogen and lower alkyl.

The foregoing compounds may be prepared by various different routes of synthesis. In general, however, the preparatory techniques involve the addition of lower aliphatic alcohols, such as methanol, ethanol, butanol, propanol and isomeric forms of such alcohols, to suitable steroidal starting materials to effect placement of the desired 16β-alkoxy substituent thereon. The 16β-alkoxy-substituted compounds are then subjected to further reactions for their protected conversion to the useful steroid derivatives depicted by the foregoing formulae. While the reactions involved in the production of our compounds are described hereinafter with particular reference to the use of methanol for introduction of the methoxy group in β-orientation to the C–16 carbon atom of the steroid nucleus, it is to be understood that the alkoxy substituent is a direct function of the particular alcohol employed, and that all of the usual aliphatic alcohols can be used interchangeably in the basic reaction mechanisms of the invention.

By way of illustration of the general methods applicable to the production of the compounds of Formulae A, B and C, we have discovered that it is possible to effect the simultaneous addition of halogen and alkoxide across the $\Delta^{16}$ olefinic bond on either an C–11-oxygenated steroid compound such as 11,20-dioxo-5β-16-pregnen-3α-yl acetate or a non-C–11-oxygenated compound such as 20-oxo-5α-16-pregnen-3β-yl acetate, to yield the corresponding 17α-halo-16β-alkoxy derivatives. We have further found that an 16α,17α-epoxy group such as that contained in the compound 16α,17α-epoxy-11β-hydroxy-3,20-dioxo-4-pregnen-21-yl acetate, for example, can be opened to yield the corresponding 16β-alkoxy-substituted steroids.

To illustrate a typical synthesis of our invention, the compound 11,20-dioxo - 5β - 16 - pregnen-3α-yl acetate is treated with a positive halogen donor such as bromine, N-bromoacetamide or N-chlorosuccinimide in the presence of methanol (or other alcohol) and with or without an inert solvent medium such as tetrahydrofuran, or an acid catalyst such as p-toluenesulfonic acid, to produce the compound 17α-halo - 16β - methoxy-11,20-dioxo-5β-pregnan-3α-yl acetate. The latter compound is then brominated at C–21 with bromine in a suitable solvent medium, and the resulting product treated with sodium methoxide to promote the Favorskii rearrangement with recovery of the compound methyl 16β-methoxy-3α-hydroxy - 11 - oxo-5β-17(20)-pregnene-21-oate. This compound is then oxidized to the corresponding 3-ketone with chromic acid, and the ketone is converted to the 3-ethylene-dioxy-derivative with ethylene glycol in the presence of p-toluenesulfonic acid or a similar catalyst and a solvent such as benzene or toluene. Reduction of the latter compound with lithium aluminum hydride, for example, leads to the 3-ethylene-dioxy-16β-methoxy-5β-17(20) -pregnene - 11β,21 - diol. The ethylenedioxy group is then removed with dilute acid and the product acetylated at C–21. The 17α-hydroxy-20-oxo-grouping is introduced by treatment with a catalytic amount of osmium tetroxide and a suitable oxidizing agent such as phenyl iodoso diacetate or N-methyl morpholine oxide peroxide, to yield 16β-methoxy-11β,17α-dihydroxy-3,20-dioxo-5β-pregnan-21-yl acetate. This compound is readily converted to 16β-methoxy-11β,17α-dihydroxy-3,20-dioxo-4-pregnen-21-yl acetate (16β-methoxy hydrocortisone 21-acetate) by monobromination and dehydrobromination. From this compound, one may readily obtain the 16β - methoxy-17α-hydroxy-3,11,20-trioxo-4-pregnen-21-yl acetate (16β-methoxy cortisone 21-acetate) by oxidation with chromic acid. The corresponding 1-dehydro derivatives are prepared from the saturated 3-oxo compound by dibromination followed by dehydrobromination, or by treatment with selenium dioxide, or by microbiological dehydrogenation of the 3-oxo-$\Delta^4$-derivative with the microorganism *Corynebacterium simplex* (A.T.C.C. 6949), for example, to furnish 16β-methoxy-11β,17α - dihydroxy-3,20-dioxo-1,4-pregnadien-21-yl acetate (16β-methoxyprednisolone 21-acetate), which is oxidized as above to yield 16β-methoxy-17α-hydroxy-3,11, 20- trioxo-1,4-pregnadien-21-yl acetate (16β-methoxy prednisone 21-acetate).

By treating the compound 16β-methoxy-11β,17α-dihydroxy-3,20-dioxo-1,4-pregnadien-21-yl acetate with a sulfonyl chloride such as methanesulfonyl chloride or benzenesulfonyl chloride in a solvent such as pyridine or dimethylformamide, one obtains 16β-methoxy-17α-hydroxy-3,20-dioxo-1,4,9(11) - pregnatrien - 21 - yl acetate. This compound may be treated with N-bromoacetamide in the presence of water and a strong acid catalyst such as perchloric acid, to produce the 9α-bromo-11β-hydroxy compound which is converted to the 9β,11β-epoxy-derivative with potassium acetate. The epoxy-compound is then treated with hydrogen chloride or hydrogen fluoride to yield the 9α-chloro- or 9α-fluoro-16β-methoxy-11β,17α-dihydroxy - 3,20 - dioxo-1,4-pregnadien-21-yl acetate (9α-chloro- or 9α-fluoro-16β-methoxy prednisolone 21-acetate). These compounds may be converted to the corresponding 11-oxo-substituted steroids by oxidation with chromic acid. The 9α-halo derivatives of hydrocortisone and cortisone are prepared by a similar sequence of reactions.

In an alternate synthesis, the addition of halogen and methoxide may be carried out on a non-C–11-oxygenated compound, and an 11-hydroxy group introduced at a later point in the synthesis by microbiological techniques. For example, 20-oxo-5α-16-pregnen-3β-yl acetate may be treated with N-bromoacetamide in methanol to provide the compound 17α-bromo-16β-methoxy-20-oxo-5α-pregnan-3β-yl acetate. This compound is then brominated at C–21, carried through the Favorskii rearrangement, and the side-chain elaborated after oxidation and ketalization at C–3 in the manner previously described above. The $\Delta^{1,4}$-3-oxo system is introduced by standard methods described above into the resulting 16β-methoxy-17α,21-dihydroxy-5α-pregnane-3,20-dione and this compound is then hydroxylated by use of the microorganism *Curvularia lunata* (N.R.R.L. 2380) to provide 16β-methoxy-11β,17α,21-trihydroxy - 1,4 - pregnadien-3,20-dione (16β-methoxy prednisolone) which is convertible to the 9α-halo derivatives in exactly the same manner as described above.

A further preparative procedure for the unique compounds of our invention involves the reaction of 16α,17α-epoxy - 11β - hydroxy - 3,20 - dioxo - 4 - pregnen - 21-yl acetate (see U.S. Patent No. 2,835,683) with methanol in the presence of an acid such as perchloric or p-toluenesulfonic, to yield directly, 16β-methoxy-11β,17α,21-trihydroxy-4-pregnene-3,20-dione (16β-methoxy hydrocortisone) which is then acetylated to the corresponding 21-acetate. The latter compound may then be treated for the production of the remaining steroids of our invention in the manner described hereinbefore.

Of course, any of the 21-acetates described above may be converted to the 21-steroid alcohols by mild acidic or basic hydrolysis. The alcohols are, in turn, converted to useful esters by treatment with a suitable acid chloride or acid anhydride in a solvent system such as pyridine. Useful esters include, for example, the acetate, propionate, isovalerate, enanthate, tertiary-butyl acetate, cyclopentyl propionate, carbethoxylate phenoxy acetate and substituted phenoxyacetates, and furoate and substituted furoates. Other valuable esters include water-soluble derivatives such as the monosodium succinate, phthalate, sulfobenzoate, phosphate, sulfate as well as glycinate salts and gluconates.

The 6-methyl and 6-halo derivatives of the novel corticoids of the invention may be readily prepared. The following illustrates a typical synthesis for the production of these compounds:

16β - methoxy - 11β,17α,21 - trihydroxy - 4 - pregnene-3,20-dione is converted to its 3,20-bisethylene ketal by treatment with ethylene glycol in benzene in the presence of para-toluenesulfonic acid. During this process the double bond shifts from the 4,5-positions to the 5,6-positions. This double bond is then epoxidized with perphthalic acid to yield a mixture of the 5α,6α- and 5β,6β-epoxides. The 5α,6α-epoxide is separated by chromatography on activated magnesium silicate. To produce the 6-methyl derivatives of the compounds of the invention, the foregoing epoxide is reacted with methyl magnesium iodide, followed by hydrolysis of the 3 and 20 ketal groups with oxalic acid in methanol. The resulting 3-oxo-5α-hydroxy-6β-methyl steroid is treated with hydrogen chloride in ethanol to derive the desired 6α - methyl - 16β - methoxy - 11β,17α,21 - trihydroxy - 4-pregnene-3,20-dione. The latter compound may be acetylated at C–21 to give the corresponding 6α-methyl-16β-methoxy - 11β,17α - dihydroxy - 3,20 - dioxo - 4 - pregnen-21-yl acetate which is carried through the same sequence of reactions as described above with respect to the non-substituted compound. This provides, for example, 6α-methyl-16β-methoxy-17α-hydroxy-3,11,20-trioxo-4-pregnen-21-yl acetate;
6α-methyl-9α-fluoro-16β-methoxy-11β,17α-dihydroxy-3,20-dioxo-4-pregnen-21-yl acetate;
6α-methyl-9α-fluoro-16β-methoxy-11β,17α,21-trihydroxy-4-pregnene-3,20-dione;
6α-methyl-16β-methoxy-11β,17α,21-trihydroxy-1,4-pregnadiene-3,20-dione;
6α-methyl-16β-methoxy-11β,17α-dihydroxy-3,20-dioxo-1,4-pregnadien-21-yl acetate;
6α-methyl-16β-methoxy-17α-hydroxy-3,11,20-trioxo-1,4-pregnadien-21-yl acetate;
6α-methyl-9α-chloro-16β-methoxy-11β,17α-dihydroxy-3,20-dioxo-1,4-pregnadien-21-yl acetate;
6α-methyl-9α-fluoro-16β-methoxy-11β,17α-dihydroxy-3,20-dioxo-1,4-pregnadien-21-yl acetate;
6α-methyl-9α-fluoro-16β-methoxy-11β,17α,21-trihydroxy-1,4-pregnadiene-3,20-dione;
6α-methyl-9α-fluoro-16β-methoxy-17α-hydroxy-3,11,20-trioxo-1,4-pregnadien-21-yl acetate; and
6α-methyl-9α-fluoro-16β-methoxy-17α,21-dihydroxy-1,4-pregnadiene-3,11,20-trione.

To produce the 6-fluoro or 6-chloro derivatives, for example, a similar sequence of reactions is followed. Thus the 5α,6α-epoxide described above is treated with hydrogen fluoride to open the epoxy bond. The ketal groups are then removed by treatment with a dilute solution of sulfuric acid in methanol to yield the 3-oxo-5α-hydroxy-6β-fluoro steroid. The latter compound is treated with hydrogen chloride in ethanol to give the desired 6α - fluoro - 16β - methoxy - 11β,17α,21 - trihydroxy-4-pregnene-3,20-dione. Similarly, by substituting hydrogen chloride for hydrogen fluoride, one obtains 6α-chloro - 16β - methoxy - 11β,17α,21 - trihydroxy - 4-pregnene-3,20-dione. These two compounds are then converted to the other 6α-fluoro and 6α-chlorocorticoids of the invention in the manner outlined above for the corresponding 6α-methyl derivatives. Typical compounds which are produced in this manner include the following:

6α-fluoro-16β-methoxy-11β,17α-dihydroxy-3,20-dioxo-4-pregnen-21-yl acetate;
6α-fluoro-16β-methoxy-17α-hydroxy-3,11,20-trioxo-4-pregnen-21-yl acetate;
6α,9α-difluoro-16β-methoxy-11β,17α-dihydroxy-3,20-dioxo-4-pregnen-21-yl acetate;
6α,9α-difluoro-16β-methoxy-17α-hydroxy-3,11,20-trioxo-4-pregnen-21-yl acetate;
6α-fluoro-16β-methoxy-11β,17α-dihydroxy-3,20-dioxo-1,4-pregnadien-21-yl acetate;
6α-fluoro-16β-methoxy-11β,17α,21-trihydroxy-1,4-pregnadiene-3,20-dione;
6α-fluoro-16β-methoxy-17α-hydroxy-3,11,20-trioxo-1,4-pregnadien-21-yl acetate;
6α,9α-difluoro-16β-methoxy-11β,17α-dihydroxy-3,20-dioxo-1,4-pregnadien-21-yl acetate;
6α,9α-difluoro-16β-methoxy-11β,17α,21-trihydroxy-1,4-pregnadiene-3,20-dione;
6α-fluoro-9α-chloro-16β-methoxy-11β,17α-dihydroxy-3,20-dioxo-1,4-pregnadien-21-yl acetate;
6α,9α-difluoro-16β-methoxy-17α-hydroxy-3,11,20-trioxo-1,4-pregnadien-21-yl acetate;
6α-chloro-16β-methoxy-11β,17α-dihydroxy-3,20-dioxo-4-pregnen-21-yl acetate;
6α-chloro-16β-methoxy-17α-hydroxy-3,11,20-trioxo-4-pregnen-21-yl acetate;
6α-chloro-9α-fluoro-16β-methoxy-11β,17α-dihydroxy-3,20-dioxo-4-pregnen-21-yl acetate;
6α-chloro-16β-methoxy-11β,17α-dihydroxy-3,20-dioxo-1,4-pregnadien-21-yl acetate;
6α-chloro-16β-methoxy-11β,17α,21-trihydroxy-1,4-pregnadiene-3,20-dione;
6α-chloro-16β-methoxy-17α-hydroxy-3,11,20-trioxo-1,4-pregnadien-21-yl acetate;
6α-chloro-9α-fluoro-16β-methoxy-11β,17α-dihydroxy-3,20-dioxo-1,4-pregnadien-21-yl acetate;
6α-chloro-9α-fluoro-16β-methoxy-11β,17α,21-trihydroxy-1,4-pregnadiene-3,20-dione;
6α-chloro-9α-fluoro-16β-methoxy-17α-hydroxy-3,11,20-trioxo-1,4-pregnadien-21-yl acetate; and
6α,9α-dichloro-16β-methoxy-11β,17α-dihydroxy-3,20-dioxo-1,4-pregnadien-21-yl acetate.

It is believed that the foregoing as well as other features and objects of our invention will be best understood by reference to the following specific examples illustrating the actual preparation of novel compounds of the invention via various different syntheses:

EXAMPLE I

*Synthesis of the Compound, 17α-Bromo-16β-Methoxy-11,20-Dioxo 5β-Pregnan-3α-Yl Acetate, as Represented by the Formula:*

(I)

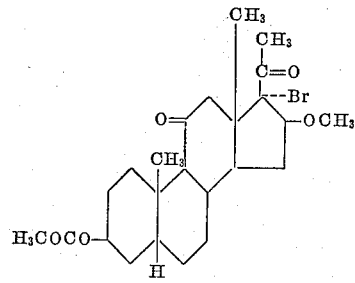

A solution consisting of 5 grams of 11,20-dioxo-5β-pregn-16-en-3α-yl acetate in a mixture of 100 milliliters of tetrahydrofuran and 50 milliliters of methanol was treated in small portions, with stirring, with 5 grams of N-bromo-acetamide. The resulting solution was allowed to stand at room temperature for 18 hours. It was then poured into ice water with stirring, some sodium bisulfite was added to decompose excess reagent, and the product was then extracted with ether. The ethereal extracts were combined, dried and evaporated to an oily residue which was triturated with methanol to yield a crystalline material corresponding to the desired compound of Formula I. The product was recrystallized from ether-pentane. It has the melting point 216–217° C.; $[\alpha]_D -11°$ (chloroform). It yielded the following analytical data based on the empirical formula $C_{24}H_{35}O_5Br$:

|  | C | H |
|---|---|---|
| Theoretical | 59.62 | 7.30 |
| Found | 59.63 | 7.56 |

EXAMPLE II

Synthesis of the Compound, 17α,21-Dibromo-16β-Methoxy-11,20-Dioxo-5β-Pregnan-3α-Yl Acetate, as Represented by the Formula:

(II)
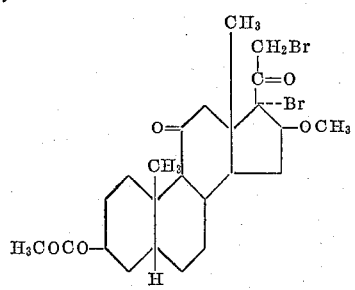

A solution consisting of 6 grams of the compound of Formula I (Example I) in 60 milliliters of glacial acetic acid was treated dropwise at room temperature with a solution of 2.2 grams of bromine in 10 milliliters of acetic acid. The solution was stirred an additional ten minutes and then poured into ice-water. The crude product corresponding to the compound of Formula II was filtered and used in the following synthesis without further purification.

EXAMPLE III

Synthesis of the Compound, Methyl 16β-Methoxy-3α-Hydroxy-11-Oxo-5β-17(20)-Pregnene-21-Oate, as Represented by the Formula:

(III)
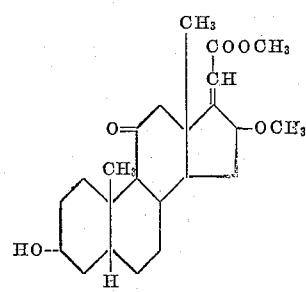

To a solution consisting of 2.0 grams of the compound of Formula II in 80 milliliters of methanol, there were added 3 grams of sodium methylate and the solution was refluxed for 2 hours. The solution was then concentrated to about ½ its volume, diluted with water and neutralized with hydrochloric acid. The precipitated crude product was filtered and recrystallized from ether twice to yield the desired compound of Formula III.

($\lambda_{max.}^{MeOH}$ 223 mμ)

EXAMPLE IV

Synthesis of the Compound, Methyl 16β-Methoxy-3,11-Dioxo-5β-17(20)-Pregnene-21-Oate, as Represented by the Formula:

(IV)
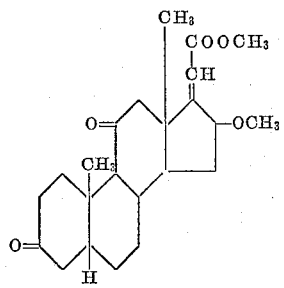

A solution consisting of 2 grams of the compound of Formula III in 100 milliliters of acetone was cooled to 0° C. and titrated with chromic-sulfuric acid reagent (266 milligrams chromic acid/ml.) until persistence of orange color occurred. The mixture was then diluted with water and the excess reagent destroyed by the addition of a small amount of sodium bisulfite. The product was extracted with ethyl acetate and the extracts concentrated to yield the desired compound of Formula IV.

($\lambda_{max.}^{MeOH}$ 222 mμ)

EXAMPLE V

Synthesis of the Compound, Methyl 3-Ethylenedioxy-16β-Methoxy-11-Oxo-5β-17(20)-Pregnene-21-Oate, as Represented by the Formula:

(V)
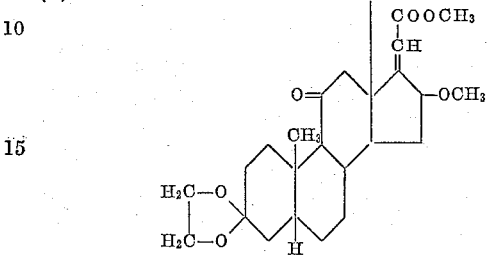

To a solution of 1.5 grams of the compound of Formula IV in 150 milliliters of benzene, there were added 10 milliliters of ethylene glycol and 0.15 gram of p-toluene sulfonic acid, and the mixture was refluxed for 6 hours in a flask provided with a Dean-Starke separator. The cooled reaction mixture was then washed with a 1 percent sodium bicarbonate solution. The dried benzene layer was poured onto a column of 150 grams of activated magnesium silicate. The desired product of Formula V was then eluted with methylene chloride.

EXAMPLE VI

Synthesis of the Compound, 3-Ethylenedioxy-16β-Methoxy-5β-17(20)-Pregnene-11β,21-Diol, as Represented by the Formula:

(VI)
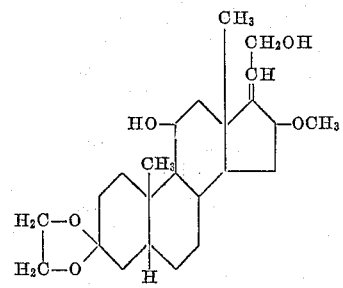

A solution consisting of 1.5 gram of the compound of Formula V in 75 milliliters of tetrahydrofuran was added dropwise to a stirred slurry of 1.5 gram of lithium aluminum hydride in 50 milliliters of ether. After the addition was complete, the mixture was refluxed for one-half hour, then chilled in ice and water added dropwise to decompose the excess hydride. Sufficient water was added to precipitate the inorganic hydroxides, and the organic layer was then decanted and the residue washed well with methylene chloride. The combined organic solution was concentrated to dryness under reduced pressure, and the residue crystallized from ethyl acetate to yield the desired compound of Formula VI.

EXAMPLE VII

Synthesis of the Compound, 16β-Methoxy-11β,21-Dihydroxy-5β-17(20)-Pregnene-3-One, as Represented by the Formula:

(VII)
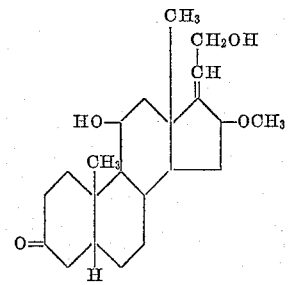

A solution consisting of 2.5 grams of the compound of Formula VI in 40 milliliters of acetic acid was heated on the steam bath and 40 milliliters of water was added to the hot solution. This mixture was heated on the steam bath for one (1) hour, then poured into cold water and the product extracted with methylene chloride. The organic solution was washed with water, and concentrated to dryness in vacuo. The residue was then crystallized from ether to yield the desired compound of Formula VII.

EXAMPLE VIII

Synthesis of the Compound, 16β-Methoxy-11β-Hydroxy-3-Oxo-5β-17(20)-Pregnen-21-Yl Acetate, as Represented by the Formula:

(VIII)

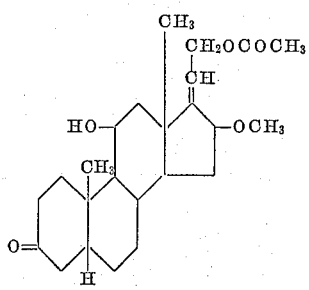

A mixture consisting of one (1) gram of the compound of Formula VII, 10 milliliters of dry pyridine and 2 milliliters of acetic anhydride was allowed to stand at room temperature for 16 hours. Some ice was then added, and the mixture poured into ice-water. The resulting crude product was filtered, washed well with water and then crystallized from aqueous methanol to yield the desired compound of Formula VIII.

EXAMPLE IX

Synthesis of the Compound, 16β-Methoxy-11β,17α-Dihydroxy-3,20-Dioxo-5β-Pregnan-21-Yl Acetate, as Represented by the Formula:

(IX)

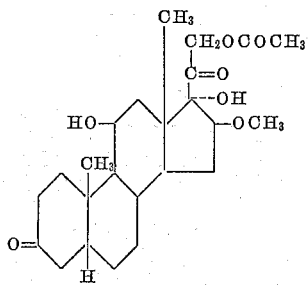

A solution of N-methylmorpholine oxide peroxide was prepared by adding 6.2 milliliters of 90% hydrogen peroxide to a solution of 11.4 grams of N-methylmorpholine in 95 milliliters of t-butanol. The mixture was stirred for 18 hours, dried over calcium sulfate and filtered. To a solution of 5.0 grams of the compound of Formula VIII in 250 milliliters of dry t-butanol, there were added 7 milliliters of pyridine and 85 milligrams of osmium tetraoxide. The solution was stirred for 30 minutes and then 24 milliliters of the solution of N-methylmorpholine oxide peroxide were added rapidly. The mixture was stirred for one (1) hour, and then half of the solvent was removed under reduced pressure. The reaction mixture was stirred with 5% sodium sulfite solution for one (1) hour, then diluted with water and chilled over-night. The resulting precipitate was recovered by filtering, washed with 4:1 water-t-butanol, then with water, and dried. Recrystallization from ethyl acetate yielded the desired compound of Formula IX.

EXAMPLE X

Synthesis of the Compound, 4-Bromo-16β-Methoxy-11β,17α-Dihydroxy-3,20-Dioxo-5β-Pregnan-21-Yl Acetate, as Represented by the Formula:

(X)

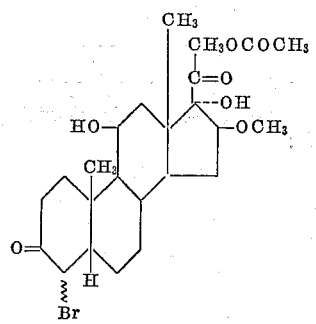

To a solution consisting of 500 milligrams of the compound of Formula IX in 15 milliliters of tertiary-butyl alcohol and 15 milliliters of methylene chloride at about 30° C., there was rapidly added a solution of 185 milligrams of bromine in 15 milliliters of tertiary-butyl alcohol. Following completion of bromination (2 hours) the solution was evaporated to dryness under reduced pressure. The crude residue was slurried with water, filtered and dried to yield the desired compound of Formula X which was carried directly into the synthesis of Example XI below without further purification.

EXAMPLE XI

Synthesis of the Compound, 16β-Methoxy-11β,17α-Dihydroxy-3,20-Dioxo-4-Pregnen-21-Yl Acetate, as Represented by the Formula:

(XI)

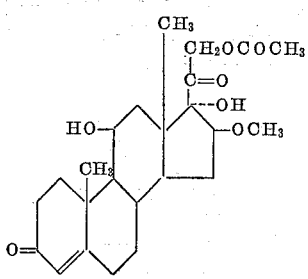

(A) To a solution consisting of 180 milligrams of the crude product of Formula X prepared in accordance with the preceding example in 8 milliliters of tertiary-butanol and 4 milliliters of methylene chloride, were added 60 milligrams of semi-carbazide, and the mixture was stirred in a nitrogen atmosphere for two (2) hours at room temperature. The solvent was removed under reduced pressure and the residue dissolved in 10 milliliters of 80% acetic acid containing excess 70% pyruvic acid. The mixture was permitted to stand at room temperature for 20 hours, and it was then neutralized with 5% sodium hydroxide and extracted with methylene chloride. The extracts were concentrated to dryness and the residue subjected to chromatographic resolution on activated magnesium silicate. The desired 16β-methoxy hydrocortisone-21-acetate of Formula XI was eluted with 2% acetone in ether and crystallized from acetone-hexane.

$$(\lambda_{max.}^{MeOH} = 240 \text{ m}\mu)$$

(B) In an alternate synthesis of the compound of Formula XI, a solution of 2 grams of 16α,17α-epoxy-11β-hydroxy-3,20-dioxo-4-pregnen-21-yl acetate in 100 milliliters of methanol containing 0.75 milliliter of 70% perchloric acid was allowed to stand at room temperature for four (4) hours. The solution was then neutralized with sodium bicarbonate solution and most of the methanol removed under reduced pressure. The product was extracted with methylene chloride which was then evaporated and the crude steroid was acetylated with 2 milliliters of acetic anhydride in 10 milliliters of pyridine for 18 hours at room temperature. The reaction mixture was then poured into ice-water and the desired compound of Formula XI recovered by filtering and then crystallized from acetone-hexane ($\lambda_{max.}^{MeOH} = 240$ m$\mu$)

EXAMPLE XII

*Synthesis of the Compound, 16β-Methoxy-11β,17α,21-Trihydroxy-4-Pregnene-3,20-Dione, as Represented by the Formula:*

(XII)

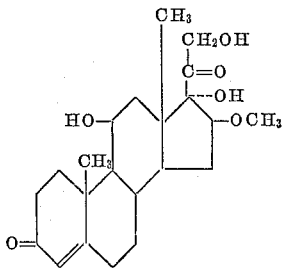

A solution consisting of 50 milligrams of the compound of Formula XI and 20 milligrams of potassium carbonate in a mixture of 5 milliliters of methanol and 1 milliliter of water was refluxed for one-half hour, then concentrated under reduced pressure. The resulting precipitate was filtered and washed with water. It is then crystallized from acetone-hexane to yield the desired compound of Formula XII ($\lambda_{max.}^{MeOH} = 240$ m$\mu$)

EXAMPLE XIII

*Synthesis of the Compound, 16β-Methoxy-17α-Hydroxy-3,11,20-Trioxo-4-Pregnen-21-Yl Acetate, as Represented by the Formula:*

(XIII)

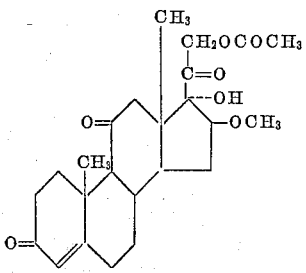

A solution consisting of 100 milligrams of the compound of Formula XI in 10 millileters of acetone was cooled and titrated with chromic-sulfuric acid reagent (266 milligrams chromic acid/milliliter) until persistence of orange color. Excess reagent was destroyed with a few drops of methanol, and the solution was then diluted with water and extracted with methylene chloride. The extracts were concentrated to dryness and the residue crystallized from acetone-hexane to yield the pure product of Formula XIII.

($\lambda_{max.}^{MeOH} = 238$ m$\mu$)

EXAMPLE XIV

*Synthesis of the Compound, 16β-Methoxy-17α,21-Dihydroxy-4-Pregnene-3,11,20-Trione, as Represented by the Formula:*

(XIV)

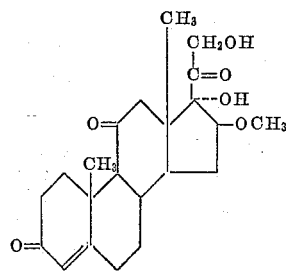

A 50 milligram sample of the compound of Formula XIII was hydrolyzed in the manner outlined in Example XII and the desired compound of Formula XIV crystallized from aqueous methanol ($\lambda_{max.}^{MeOH} = 238$ m$\mu$)

EXAMPLE XV

*Synthesis of the Compound, 16β-Methoxy-17α-Hydroxy-3,20-Dioxo-4,9(11)-Pregnadien-21-Yl Acetate, Represented by the Formula:*

(XV)

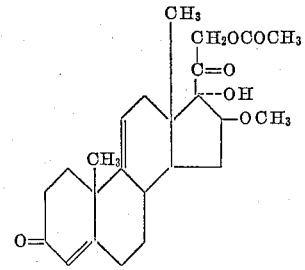

To a solution consisting of 300 milligrams of the compound of Example XI in 5 milliliters of pyridine, there was added a solution of 0.2 milliliter of benzenesulfonyl chloride in 3 milliliters of pyridine. The mixture was permitted to stand for four (4) hours, then poured into ice-hydrochloric acid, and the resulting precipitate recovered by filtering and thence crystallized from acetone-hexane to yield the desired compound of Formula XV.

($\lambda_{max.}^{MeOH} = 239$ m$\mu$)

EXAMPLE XVI

*Synthesis of the Compound, 9α-Bromo-16β-Methoxy-11β,17α-Dihydroxy-3,20-Dioxo-4-Pregnen-21-Yl Acetate, as Represented by the Formula:*

(XVI)

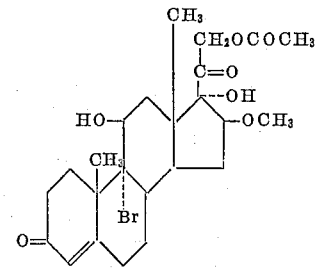

A solution consisting of 200 milligrams of the compound of Formula XV in a mixture of 20 milliliters of Dioxane and 2 milliliters of water, containing 100 milligrams of N-bromoacetamide and one (1) milliliter of 1.5 N perchloric acid, was stirred for two (2) hours. A solution of 200 milligrams of sodium sulfite in 2 milliliters of water was then added, and the solution extracted with methylene chloride. The extracts were washed with water, dried and evaporated. The residue was crystallized from acetone to yield the desired compound of Formula XVI.

($\lambda_{max.}^{MeOH} = 243$ m$\mu$)

EXAMPLE XVII

*Synthesis of the Compound, 9β,11β-Epoxy-16β-Methoxy-17α-Hydroxy-3,20-Dioxo-4-Pregnen-21-Yl Acetate, as Represented by the Formula:*

(XVII)

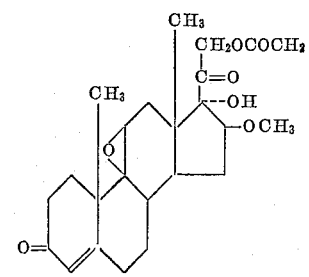

To a solution consisting of 300 milligrams of the compound of Formula XVI in 20 milliliters of methanol, there was added 300 milligrams of potassium acetate. The mixture was heated under reflux for two (2) hours, and then the solvent was removed under reduced pressure. The residue was triturated with water and the solid product of Formula XVII crystallized from aqueous methanol.

EXAMPLE XVIII

Synthesis of the Compound, 9α-Fluoro-16β-Methoxy-11β,17α-Dihydroxy-3,20-Dioxo-4-Pregnen-21-Yl Acetate, as Represented by the Formula:

(XVIII)

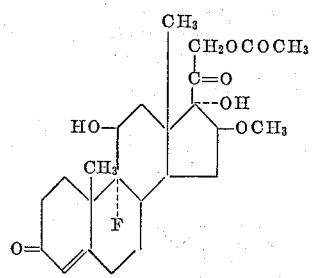

A solution consisting of 150 milligrams of the 9β,11β-epoxy derivative of Formula XVII in 10 milliliters of alcohol-free chloroform was saturated with anhydrous hydrogen fluoride at 0° C. The mixture was permitted to stand at 0° C. for four (4) hours, and then the solvent was removed under a stream of nitrogen. The residue was crystallized from acetone to yield the desired compound of Formula XVIII.

EXAMPLE XIX

Synthesis of the Compound, 9α-Fluoro-16β-Methoxy-17α-Hydroxy-3,11,20-Trioxo-4-Pregnen-21-Yl Acetate, as Represented by the Formula:

(XIX)

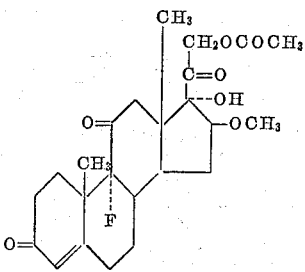

The compound of Formula XVIII, in amount 100 milligrams, was oxidized with chromic acid-sulfuric acid reagent in the manner described in Example XIII to yield the desired compound of Formula XIX.

EXAMPLE XX

Synthesis of the Compound, 9α-Fluoro-16β-Methoxy-11β,17α,21-Trihydroxy-4-Pregnene-3,20-Dione, as Represented by the Formula:

(XX)

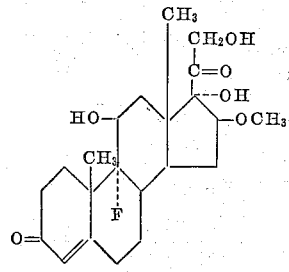

The compound of Formula XVIII, in amount 50 milligrams, was hydrolyzed in accordance with the procedure described in Example XII. The desired compound of Formula XX was crystallized from acetone.

EXAMPLE XXI

Synthesis of the Compound, 2,4-Dibromo-16β-Methoxy-11β,17α - Dihydroxy - 3,20 - Dioxo - 5β - Pregnan - 21-Yl Acetate, as Represented by the Formula:

(XXI)

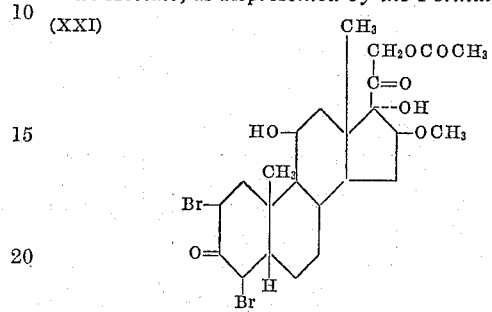

A solution consisting of 1.75 grams of the compound of Formula IX in 30 milliliters of dioxane was dibrominated at C–2 and C–4 by the rapid addition of a solution of 1.30 grams of bromine in 10 milliliters of dioxane. The reaction mixture was poured into water and the precipitate filtered and washed with water. The compound of Formula XXI as thus produced was used without further purification in the synthesis described in Example XXII below.

EXAMPLE XXII

Synthesis of the Compound, 16β-Methoxy-11β,17α-Dihydroxy-3,20-Dioxo-1,4-Pregnadien-21-Yl Acetate, as Represented by the Formula:

(XXII)

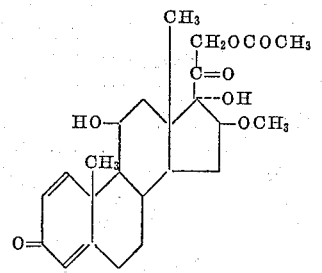

(A) The 2,4-dibromo-steroid of Formula XXI, in amount 500 milligrams, was dehydrobrominated by refluxing for two (2) hours in 10 milliliters of dimethylformamide containing 85 milligrams of calcium carbonate. The mixture was then poured into dilute hydrochloric acid and extracted with methylene chloride. The extract was concentrated, and the residue chromatographed on activated magnesium silicate. The fractions eluted with 60% ether in hexane to 100% ether were combined and crystallized from acetone-hexane to yield the desired prednisolone derivative of Formula XXII.

$$(\lambda_{max.}^{MeOH} = 242 \text{ m}\mu)$$

(B) In an alternate synthesis for the preparation of the compound of Formula XXII, 2.0 grams of the compound of Formula XI were fermented by means of the microorganism *Corynebacterium simplex* (A.T.C.C. 6946) in accordance with the biochemical synthesis described in U.S. Patent Number 2,837,464 issued to A. Nobile on June 3, 1958. The crude product thus produced was chromatographed and recrystallized in the manner described above to recover the desired compound of Formula XXII.

EXAMPLE XXIII

Synthesis of the Compound, 16β-Methoxy-11β,17α,21-Trihydroxy-1,4 - Pregnadiene - 3,20 - Dione, as Represented by the Formula:

(XXIII)

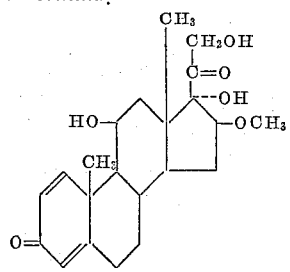

The compound of Formula XXII, in amount of 50 milligrams, was hydrolyzed according to the procedure described in Example XII. The desired compound of Formula XXIII was crystallized from acetone.

EXAMPLE XXIV

Synthesis of the Compound, 16β-Methoxy-17α-Hydroxy-3,11,20-Trioxo-1,4-Pregnadien-21-Yl Acetate, as Represented by Formula:

(XXIV)

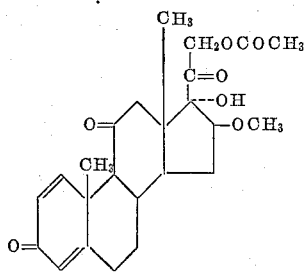

A solution consisting of 100 milligrams of the compound of Formula XXII in 10 milliliters of acetone was oxidized with chromic-sulfuric acid reagent in the manner described in Example XIII. The desired product of Formula XXIV was crystallized from acetone-hexone.

($\lambda_{max.}^{MeOH} = 237$ mμ)

EXAMPLE XXV

Synthesis of the Compound, 16β-Methoxy-17α,21-Dihydroxy-1,4-Pregnadiene-3,11,20-Trione, as Represented by the Formula:

(XXV)

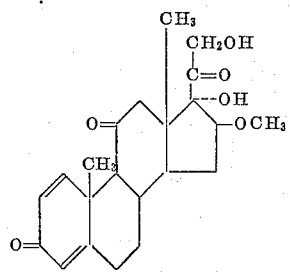

The compound of Formula XXIV was hydrolyzed according to the technique described in Example XII, and the desired product of Formula XXV crystallized from acetone-hexane.

EXAMPLE XXVI

Synthesis of the Compound, 16β-Methoxy-17α-Hydroxy-3,20-Dioxo-1,4,9(11)-Pregnatrien - 21 - Yl Acetate, as Represented by the Formula:

(XXVI)

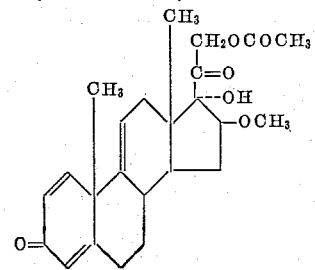

A solution consisting of 500 milligrams of the compound of Formula XXII in 3 milliliters of pyridine was treated with a solution of 0.3 milliliter of methanesulfonyl chloride in 4 milliliters of pyridine, and the reaction mixture permitted to stand for 6 hours. The mixture was then poured into ice-hydrochloric acid and the crude product filtered. Crystallization from acetone-hexane yields the desired compound of Formula XXVI.

($\lambda_{max.}^{MeOH} = 238$ mμ)

EXAMPLE XXVII

Synthesis of the Compound, 9α-Bromo-16β-Methoxy-11β,17β - Dihydroxy - 3,20 - Dioxo - 1,4 - Pregnadien-21-Yl Acetate, as Represented by the Formula:

(XXVII)

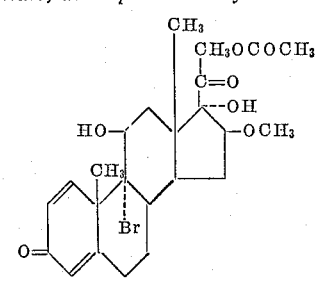

The compound of Formula XXVI, in amount of 500 milligrams, was treated with N-bromoacetamide and water in the presence of perchloric acid in accordance with the technique described in Example XVI. The resulting product of Formula XXVII was crystallized from acetone.

($\lambda_{max.}^{MeOH} = 243$ mμ)

EXAMPLE XXVIII

Synthesis of the Compound, 9β,11β-Epoxy-16β-Methoxy-17α-Hydroxy-3,20-Dioxo-1,4-Pregnadien-21-Yl Acetate, as Represented by the Formula:

(XXVIII)

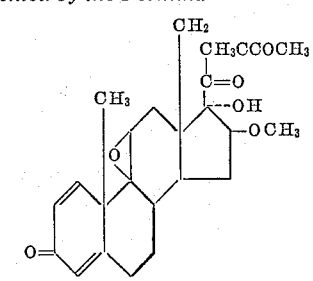

The compound of Formula XXVII, in amount of 300 milligrams, was treated with potassium acetate according to the procedure described in Example XVII. The desired product of Formula XXVIII was then recovered by crystallization from acetone-hexane.

EXAMPLE XXIX

Synthesis of the Compound, 9α-Chloro-16β-Methoxy-11β,17α - Dihydroxy - 3,20 - Dioxo - 1,4 - Pregnadien - 21-Yl Acetate, as Represented by the Formula:

(XXIX)

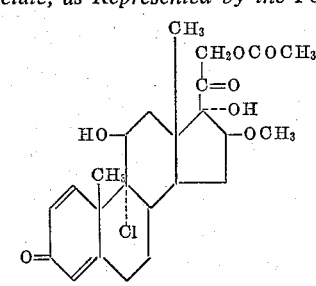

A solution consisting of 200 milligrams of the compound of Formula XXVIII in 20 milliliters of chloroform was saturated with anhydrous hydrogen chloride at 0° C. The solution was permitted to stand for six (6) hours, the solvent was then removed under reduced pressure, and

EXAMPLE XXX

Synthesis of the Compound, 9α-Fluoro-16β-Methoxy-11β,17α - Dihydroxy - 3,20 - Dioxo - 1,4 - Pregnadien - 21-Yl Acetate, as Represented by the Formula:

(XXX)

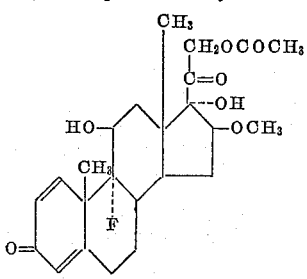

In the same manner as previously described for the synthesis of the compound of Formula XVIII, 200 milligrams of the compound of Example XXVIII was treated with hydrogen fluoride. The desired compound of Formula XXX was recrystallized from acetone.

($\lambda_{max.}^{MeOH} = 238$ m$\mu$)

EXAMPLE XXXI

Synthesis of the Compound, 9α-Fluoro-16β-Methoxy-11β,17α,21-Trihydroxy-1,4-Pregnadiene-3,20-Dione, as Represented by the Formula:

(XXXI)

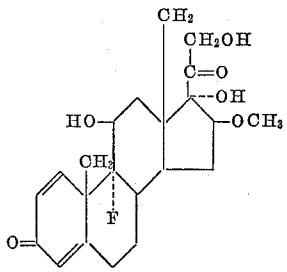

The compound of Formula XXX was hydrolyzed according to the technique described in Example XII. The resulting product of Formula XXXI was crystallized from acetone.

EXAMPLE XXXII

Synthesis of the Compound, 9α-Fluoro-16β-Methoxy-17α-Hydroxy-3,11,20-Trioxo-1,4-Pregnadien-21-Yl Acetate, as Represented by the Formula (XXXII)

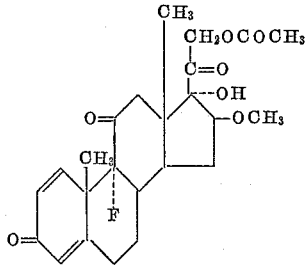

The compound of Formula XXX, in amount of 100 milligrams, was oxidized with chromic-sulfuric acid reagent according to the technique described in Example XIII. The desired compound of formula (XXXII) was crystallized from acetone-hexane.

($\lambda_{max.}^{MeOH} = 237$ m$\mu$)

EXAMPLE XXXIII

Synthesis of the Compound, 9α-Fluoro-16β-Methoxy-17α,21-Dihydroxy-1,4-Pregnadiene-3,11,20-Trione, as Represented by the Formula:

(XXXIII)

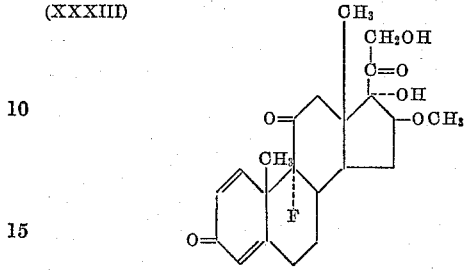

The compound of Formula XXXII, in amount of 40 milligrams, was hydrolyzed by the procedure of Example XII. The resulting product of Formula XXXIII was crystallized from acetone.

Having thus described the subject matter of our invention, what it is desired to secure by Letters Patent is:

1. The chemical compound 17α-bromo-16β-methoxy-11,20-dioxo-5β-pregnan-3α-yl acetate.
2. The chemical compound 17α,21-dibromo-16β-methoxy-11,20-dioxo-5β-pregnan-3α-yl acetate.
3. The chemical compound methyl 16β-methoxy-3α-hydroxy-11-oxo-5β-17(20)-pregnene-21-oate.
4. The chemical compound methyl 16β-methoxy-3,11-dioxo-5β-17(20)-pregnene-21-oate.
5. The chemical compound 16β-methoxy-11β,21-dihydroxy-5β-17(20)-pregnene-3-one.
6. The chemical compound 16β-methoxy-11β-hydroxy-3-oxo-5β-17(20)-pregnen-21-yl acetate.
7. The chemical compound 16β-methoxy-11β,17α-dihydroxy-3,20-dioxo-5β-pregnan-21-yl acetate.
8. Process for the production of 16β-alkoxy steroids of the pregnane series that comprises, subjecting a 16-dehydro-20-oxo-pregnane to the action of a positive halogen donor in the presence of a lower aliphatic alcohol to effect the simultaneous addition of halogen and a lower alkoxy group across the C–16:C–17 olefinic bond, and separating and recovering a corresponding 16β-lower alkoxy-17α-halo-20-oxo-pregnane derivative from the reaction mixture.
9. The process as claimed in claim 8, wherein said halogen-alkoxy additions are effected within an unreactive solvent system.
10. The process as claimed in claim 8, wherein said halogen-alkoxy additions are effected in the presence of a strong acid catalyst.
11. Process for the production of 16β-alkoxy steroids of the pregnane series that comprises, subjecting a 16-dehydro-20-oxo-pregnane to the action of a positive bromine donor selected from the group consisting of bromine and N-bromoacetamide in the presence of a lower aliphatic alcohol to effect the simultaneous addition of bromine and a lower alkoxy group across the C–16:C–17 olefinic bond, and separating and recovering a corresponding 16β-lower alkoxy-17α-bromo-20-oxo-pregnane from the reaction mixture.
12. The process as claimed in claim 11, wherein said bromo-alkoxy additions are effected within tetrahydrofuran as a solvent medium.
13. The process as claimed in claim 11, wherein said bromo-alkoxy additions are effected in the presence of p-toluenesulfonic acid as catalyst.
14. The process as claimed in claim 11, wherein said aliphatic alcohol is methanol and there is recovered the corresponding 16β-methoxy-17α-bromo-20-oxo-pregnane.
15. Process for the production of 16β-alkoxy steroids of the pregnane series that comprises, treating a 16α,17α-epoxy-20-oxo-pregnane with a lower aliphatic alcohol in the presence of a strong acid catalyst to effect opening of the epoxy linkage and addition of a lower alkoxy group at C-16, and separating and recovering the corresponding 16β-lower alkoxy-17α-hydroxy-20-oxo-pregnane derivative from the reaction mixture.

16. The process as claimed in claim 15, wherein said strong acid catalyst is an acid selected from the group consisting of perchloric and p-toluenesulfonic acids.

17. Process for the production of 16β-alkoxy steroids of the pregnane series that comprises, treating 11,20-dioxo-5β-16-pregnen-3α-yl acetate with a positive halogen donor in the presence of a lower aliphatic alcohol to effect addition of halogen and lower alkoxy substituents across the $\Delta^{16}$ double bond with the formation of a 16β-lower alkoxy-17α-halo-11,20-dioxo-5β-pregnan-3α-yl acetate.

18. Process for the production of 16β-alkoxy steroids of the pregnane series that comprises, treating 20-oxo-5α-16-pregnen-3β-yl acetate with a positive halogen donor in the presence of a lower aliphatic alcohol to effect addition of halogen and lower alkoxy substituents across the $\Delta^{16}$ double bond with the formation of a 16β-lower alkoxy-17α-halo-20-oxo-5α-pregnan-3β-yl acetate.

19. Process for the production of 16β-alkoxy steroids of the pregnane series that comprises, treating 16α,17α-epoxy-11β-hydroxy-3,20-dioxo-4-pregnen - 21 - yl acetate with a lower aliphatic alcohol in the presence of a strong acid catalyst to effect opening of the epoxy group with the formation of a 16β-lower alkoxy-11β,17α,21-trihydroxy-4-pregnene-3,20-dione.

20. Compounds having the formula:

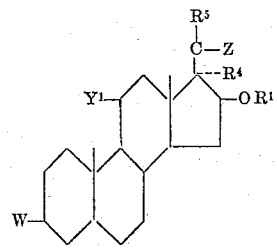

wherein W is a substituent selected from the group consisting of oxygen and hydroxy, ethylenedioxy and acetoxy radicals; $Y^1$ is a substituent selected from the group consisting of oxygen and hydroxy; Z is a substituent selected from the group consisting of oxygen and hydrogen, in which case the C-17 (20) bond is olefinic and replaces $R^4$; $R^1$ is a lower alkyl radical; $R^4$ is a substituent selected from the group consisting of hydrogen, halogen and hydroxy; and $R^5$ is a substituent selected from the group consisting of methyl, halomethyl, hydroxymethyl, methoxycarboxyl and lower acyloxymethyl.

References Cited in the file of this patent

UNITED STATES PATENTS

| | | |
|---|---|---|
| 2,716,125 | Hirschmann et al. | Aug. 23, 1955 |
| 2,752,370 | Gould | June 26, 1956 |
| 2,782,193 | Djerassi et al. | Feb. 19, 1957 |
| 2,897,219 | Wettstein et al. | July 28, 1959 |
| 2,946,812 | Fried et al. | July 26, 1960 |